(12) United States Patent
Daboub

(10) Patent No.: US 7,820,923 B1
(45) Date of Patent: Oct. 26, 2010

(54) METHOD AND APPARATUS FOR WEIGHING MOVING ARTICLES

(76) Inventor: Brent A. Daboub, 633 Brianglen Dr., Coppell, TX (US) 75019

( * ) Notice: Subject to any disclaimer, the term of this patent is extended or adjusted under 35 U.S.C. 154(b) by 320 days.

(21) Appl. No.: 12/228,623

(22) Filed: Aug. 14, 2008

Related U.S. Application Data

(60) Provisional application No. 60/967,448, filed on Sep. 5, 2007.

(51) Int. Cl.
*G01G 9/00* (2006.01)
*G01G 19/413* (2006.01)

(52) U.S. Cl. .................. 177/1; 177/25.15; 702/175; 705/414

(58) Field of Classification Search .............. 177/1, 177/25.15, 210 R; 702/173–175; 705/407, 705/414–416
See application file for complete search history.

(56) References Cited

U.S. PATENT DOCUMENTS

| 3,648,839 | A | * | 3/1972 | Bradshaw et al. ........... 209/593 |
| 3,834,474 | A | * | 9/1974 | Knol .............................. 177/1 |
| 5,393,939 | A | | 2/1995 | Nasuta, Jr. et al. |
| 5,610,372 | A | | 3/1997 | Phillips et al. |
| 6,107,579 | A | | 8/2000 | Kinnemann |
| 6,940,025 | B1 | | 9/2005 | Solomon |
| 7,430,491 | B2 | * | 9/2008 | Gutierrez et al. ............ 702/175 |
| 7,687,727 | B2 | * | 3/2010 | Turner ........................... 177/1 |
| 2009/0216487 | A1 | * | 8/2009 | Streder et al. ................ 702/175 |

* cited by examiner

*Primary Examiner*—Randy W Gibson
(74) *Attorney, Agent, or Firm*—Drude Faulconer

(57) ABSTRACT

A weigh-on-the-fly WOF module for weighing a mail piece as it is being sorted by a mail sort machine. The piece is delivered to entry pinch rollers in the WOF module which, in turn, deliver the piece into pinch at an acceleration roller. The thickness of the piece is measured the pinch at the acceleration roller is adjusted to reduce drag on the mail piece during acceleration. The acceleration roller is driven by a constant torque motor at a first known or measured velocity $V_1$ which is increased to second known or measured velocity $V_2$ when the mail piece arrives. The time of acceleration from $V_1$ to $V_2$ is measured. Once the velocities and the time of acceleration are known, the weigh of that particular mail piece can be calculated using the formula:

F=ma wherein
F=force or torque
m=mass or weight; and
a=acceleration or $(V_2-V_1)$/time.

17 Claims, 3 Drawing Sheets

METHOD AND APPARATUS FOR WEIGHING MOVING ARTICLES

CROSS-REFERENCE TO EARLIER FILED APPLICATION

The present application claims the priority of U.S. Provisional Application No. 60/967,448, filed Sep. 5, 2007.

BACKGROUND OF THE INVENTION

The present invention provides a method and apparatus for weighing articles while the articles are in motion and in particular relates to a method and apparatus for weighing articles, e.g. mail pieces, packages, etc., while the articles are moving at substantial linear speeds.

In many applications, it is desirable to weigh objects while they are moving. For example, in handling large volumes of mail, packages, etc., it is desirable to weigh the article as it is being sorted for delivery to its destination in order to determine the amount of postage required for the article. One such instance occurs when the postage for a particular mail piece is to be charged to a pre-paid "permit". Each piece has to be weighed and recorded so that the proper postage can be charged back to the permit holder. Normally, this is done by actually weighing each piece with a scale or the like. In other instances, mail pieces are weighed before the proper postage is stamped thereon. Again, this usually requires some manual handling of the articles.

Recently, several automated machines have been proposed to weigh an article such as a letter on the fly; see U.S. Pat. Nos. 5,393,939; 6,107,579; and U.S. Pat. No. 6,940,025 B1.

SUMMARY OF THE INVENTION

The present invention is for a method and apparatus using a weigh-on-the-fly (WOF) module for weighing objects in motion using the known relationship of:

Force=mass×acceleration or F=ma which translates to:

mass=Force/($\Delta$Velocity/time).

To calculate mass, at least one of the three variables (Force, Velocity, or Time) must be held constant and the remaining variable or variables must measured for each object to be weighed. In the present invention, the object is accelerated from a first velocity ($V_1$) to a second velocity ($V_2$) by a high-precision motor with encoder which maintains torque or Force at a constant value during the accelerating. The servo system will inherently have some variation in torque during acceleration that can be measured and compensated for by the programmable servo controller. Preferably, the first velocity $V_1$ (delivery linear speed of object) is known but, if desired, it can be measured using known techniques. Therefore, if the Force is held constant during acceleration and the change in velocity (V) is known or measured for each object, then the time required for accelerating the particular object from $V_1$ to $V_2$ is measured and used to accurately calculate the mass or weigh of the object.

More particularly, the present invention relates to a weigh-0 m-the-fly WOF module for weighing each mail piece as it is being sorted by a mail sort machine. The mail piece is delivered from a magazine of the sort machine to entry pinch rollers in the WOF module which, in turn, deliver the mail piece into pinch at an acceleration roller in the module. The thickness of the mail piece is measured as it passes through the entry pinch rollers and a signal representative thereof adjust the pinch gap at the acceleration roller to prevent any excessive drag on the mail piece while in contact with the roller.

The acceleration roller is driven by a high-precision, constant torque motor at a first velocity $V_1$ as the mail piece arrives. The motor, in turn, is controlled by a matched controller which can be programmed to maintain and/or increase the velocity of the motor, to measure the time; issue real time commands, etc. Upon an arrival signal, the controller increases the speed of acceleration roller to a second velocity $V_2$ and measures the time it takes to go from $V_1$ to $V_2$. It may also measure the actual velocities involved. Once the velocities and the time of acceleration are known, the weigh of that particular mail piece can be calculated using the above formula. The mail piece is then delivered to exit pinch rollers which move the mail piece out of the WOF and into a transport in the stacker section of the mail sort machine. The velocity of is acceleration roller is returned to $V_1$ and the WOF is ready to receive the next mail piece.

While the invention will be described in connection with its preferred embodiments, it will be understood that this invention is not limited thereto. On the contrary, the invention is intended to cover all alternatives, modifications, and equivalents that may be included within the spirit and scope of the invention.

DESCRIPTION OF THE INVENTION

While the invention will be described in connection with a mail sorting machine, it should be recognized that it can also be used to measure any like type of moving articles where the theory applies. Accordingly, the terms, "objects", "articles", "pieces", "letters", "units", packages, parcels, etc. may be used interchangeably throughout the following description.

Figure 1:
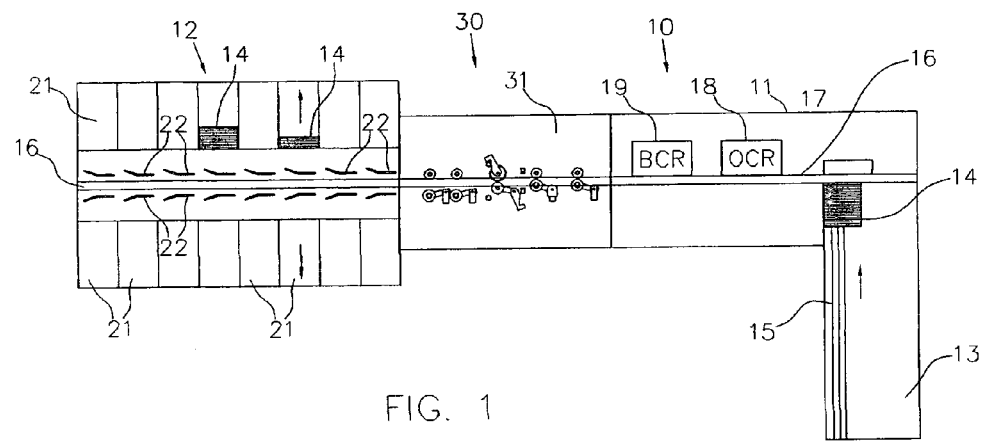
FIG. 1 is a top view of a typical, high-speed mail sorter having a weigh-on-the-fly (WOF) module of the present invention incorporated therein.

Referring now to the drawings, FIG. 1 illustrates a sort machine 10 in which one embodiment of the present invention may be incorporated. As illustrated, sort machine 10 is comprised of a "front end" 11 and at least one stacker section 12. As will be understood by those skilled in the art, front end 11 feeds a stack of documents (e.g. letters 14) one at a time from a feed magazine 15 into transport 16 and past a reader (e.g. OCR 18 and/or BCR 19). The respective reader reads identifying indicia (e.g. Zip Code, bar code, etc.) on each letter, prints the appropriate barcode and/or endorsement, verifies the accuracy of that which was printed and then generates a respective signal which, in turn, is processed to generate a designation signal for that particular letter. After a letter is read, it is fed into the transport 16 of stacker section 12.

A typical stacker section 12 is comprised of a frame which has a plurality of horizontally-spaced pockets 21 (only a few numbered for clarity) positioned thereon. As illustrated, the pockets are aligned into two parallel rows, one on each side of transport 16 as seen in FIG. 1. However, it should be understood that the present invention is equally usable with stacker sections having other pocket configurations. The transport 16 is positioned so that it can deliver a letter to any respective pocket 21. A diverter or gate 22 (only a few numbered in FIG. 1) is positioned at each pocket 21 and is actuated when a particular letter approaches to divert that letter into its designated pocket. The description of the sort machine 10 and its operation up to this point is typical of those known in the art; see U.S. Pat. No. Re 34,330 which is incorporated herein by reference.

In sort machines like that described above, it is often desirable to weigh each article as it is being sorted. For example, where the postage is charged to a permit, each piece has to be weighed and recorded so that the proper postage can be charged back to the permit holder. Also, if the proper postage, which is determined by the weigh, is to be stamped onto each respective letter, it is important that the weigh of that letter be known.

In accordance within the present invention, each letter or piece of mail (e.g. letter 14) is weighed on the fly and the weights are calculated and recorded as they are sorted by zip codes or the like into their respective pockets 21. To do this, a weigh-on-the-fly (WOF) module 30, as illustrated in FIG. 1, is positioned between the feed magazine of front end 11 and the stacker section 12 although it should be recognized that it can be used with other types of sort machines or positioned at other positions within a particular sort machine without departing from the present invention.

Figure 5:
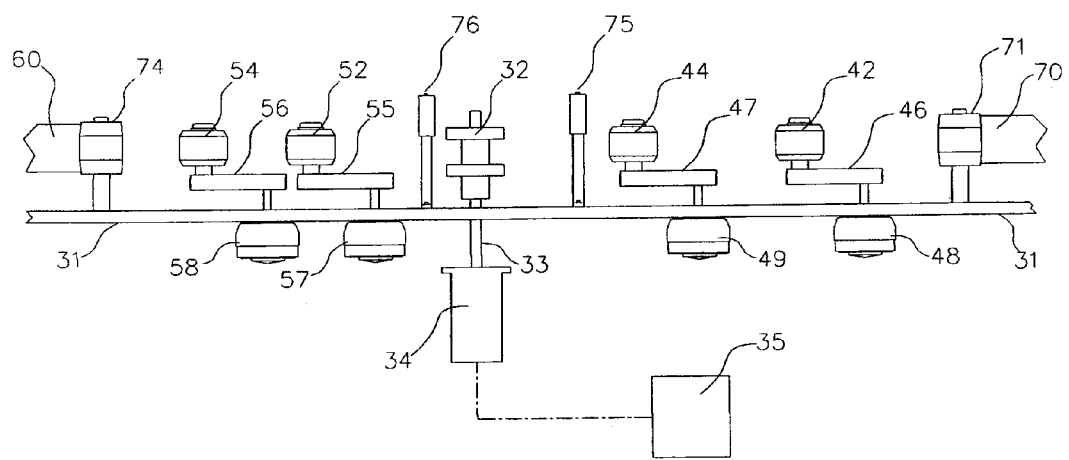
FIG. 5 is a cross-sectional view of the WOF module taken along line 5-5 of FIG. 1.

Now more particularly referring to FIGS. 2-5, WOF module 30 is basically comprised of a plate 31 having an acceleration roller 32 positioned therethrough. Roller 32 is affixed on shaft 33 which extends through an opening in plate 31. Shaft 33 is driven by a highly-precision, constant torque motor 34 which, in turn, is controlled by a matched controller 35 (FIG. 5). As will be understood by those skilled in this art, the controller 35 includes a computer which can be programmed to allow the motor 34 to effectively maintain a constant torque on roller 32 while the motor, hence roller 32, changes speeds over a range of varying loads. The servo system will inherently have some variation in torque during acceleration that can be measured and compensated for by the programmable servo controller 35, as will be understood in the art.

Also, the computer controller can be programmed to measure the length of the letter 14, measure the final velocity ($V_2$) and the time that it take the motor to accelerate the letter from its original, known or measured entry velocity ($V_1$) to the exit velocity ($V_2$) for purposes explained below. These types of "servo systems" (i.e. servo motors and matched programmable, motor controllers) are well known in the industry and are commercially-available from a variety of sources, e.g. S200 series brushless servo drive, AKM series brushless servomotor, eZMP Motion Computer, distributed by Motion Engineering, Inc., a Danaher Motion Company, Mission Viejo, Calif.

In the present invention, controller 35 is programmed to control motor 34 so that the motor drives roller 32 at first speed (i.e. first or entry velocity $V_1$) under a known constant torque and then, upon receipt of a signal (explained in detail below) speeds up to accelerate the roller 32 to a second speed (second velocity $V_2$) without any effective change in torque during the acceleration. Also, the computer of controller 35 measures the length of the letter (further explained below) and the time it takes to accelerate an article (e.g. letter) from $V_1$ to $V_2$. The servo system By maintaining the torque (i.e. force) constant during the acceleration and measuring the final velocity and the time it takes to accelerate the article from it entry velocity to its exit velocity, the mass (i.e. weigh) of the article can be determined from the following well known formula:

$$F=ma \qquad (1)$$

which translates to:

$$\text{mass}=\text{Force}/(\Delta \text{Velocity}/\text{time}) \qquad (2)$$

wherein:

F=force; m=mass; and a=acceleration

Referring again to the drawings, an acceleration pinch roller 38 is rotatably mounted on pivoted, support arm 39 which can be moved toward or away from acceleration roller 31 by solenoid 40 to adjust the gap between the rollers 31 and 38 for a purpose to be described later. Also, rollers 31, 38 provide the necessary pinch to keep the article moving through the WOF module 30 as it is being accelerated by roller 31.

Figure 2:
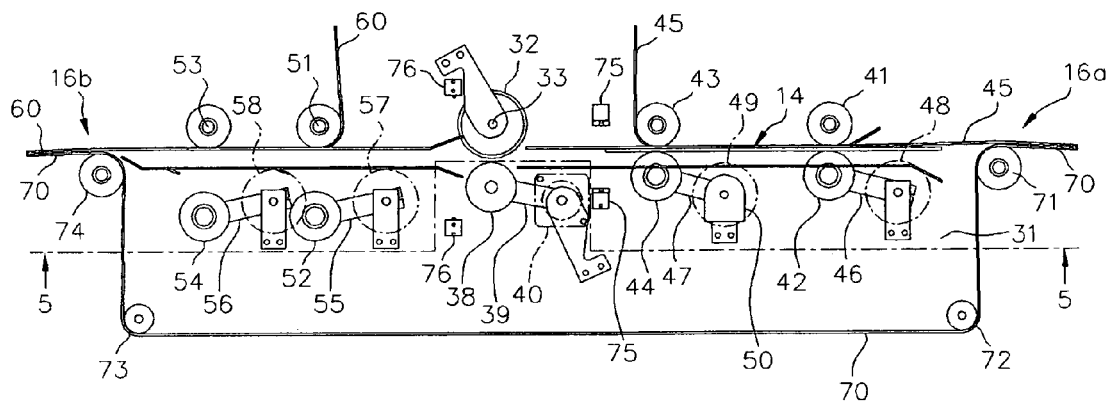
FIG. 2 is an enlarged, top view of the WOF module of FIG. 1 showing an article to be weighed as the article enters the module.
Figure 3:
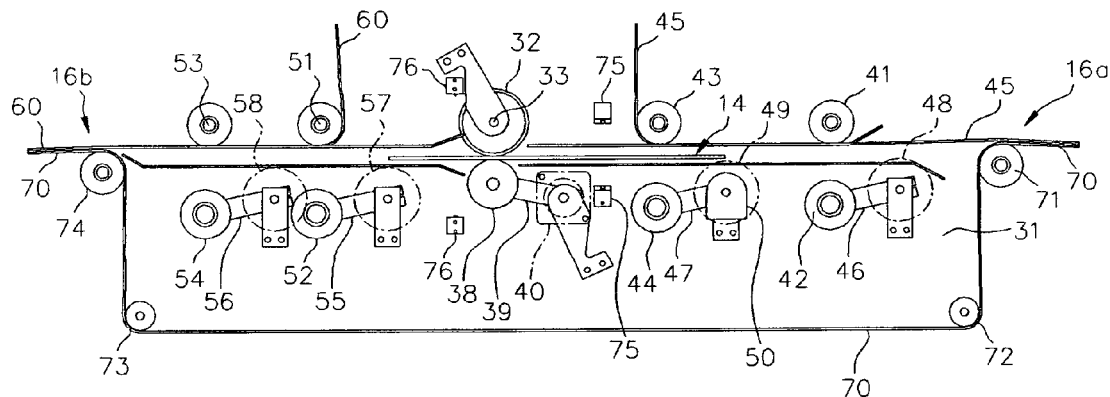
FIG. 3 is an enlarged, top view of the WOF module of FIG. 1 showing the article to be weighed as the article is accelerated within the module.
Figure 4:
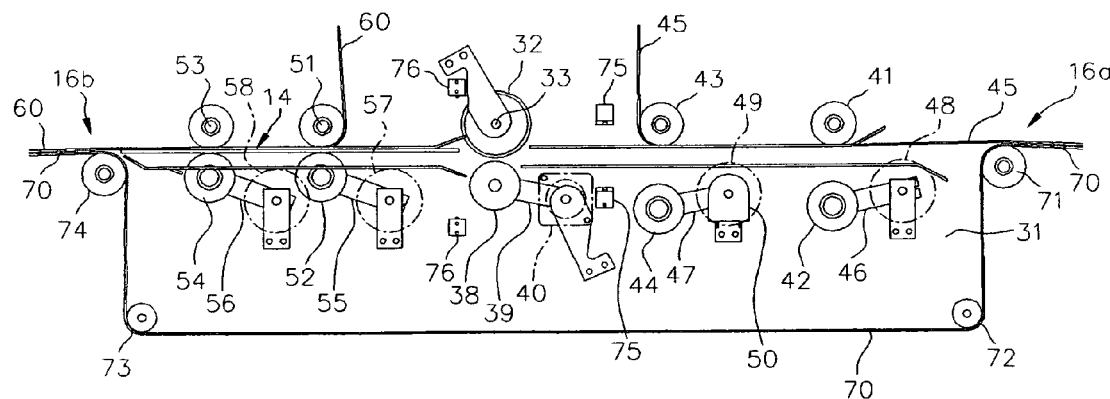
FIG. 4 is an enlarged top view of the WOF module of FIG. 1 showing the article to be weighed as the article exits the module.

Also, positioned through plate 31 upstream from acceleration roller 31 are a first set of entry pinch rollers 41, 42 and a second set of entry pinch rollers 43, 44, respectively. A moving belt 45 pass over rollers 41, 43 (shown only in FIGS. 2-4) and forms part of the entry from transport 16a into WOF module 30, as will be understood in the art. As seen in FIGS. 2-4, belt 45 cooperates with belt 70 which passes over rollers 71, 72, 73 and 74 in the WOF module 30 to form the primary transport 16 through sorter 10. Rollers 42, 44 are rotatably mounted on respective pivoted support arms 46, 47, which, in turn, can be rotated towards or away from rollers 41, 42, respectively, by solenoids 48, 49 (FIG. 5), respectively, to provide the "pinch" necessary to continue moving an article through the WOF module as will be explained below.

Also, support arm 47 is connected to a shaft encoder 50 which measures the thickness of an article as it passes between the second set of entry pinch rollers 43, 44. Such shaft encoders are known in the art and are commercially available from a variety of sources, e.g. Model No. E2-1000-315, US Digital Corp., Vancouver, WN. These devices measure the distance (i.e. gap) between rollers 43, 44 as an article passes therebetween and generate a signal representative thereof. This signal is then processed by controller 35 and transmitted to motor 40 to move arm 38 and thereby adjust the gap between rollers 32, 38 to a gap which is approximately equal to the measured thickness of the article for a purpose explained in more detail below.

Located downstream of acceleration roller 31 are a first set of exit pinch rollers 51, 52 and a second set of exit pinch rollers 53, 54. A exit moving belt 60 pass over rollers 51, 53 cooperates with moving belt 70 to provide the exit transport 16b for the article from WOF module 30 and back into transport 16. Rollers 52, 54 are rotatably mounted on respective pivoted support arms 55, 56, which, in turn, are moved towards or away from rollers 51, 53 respectively, by solenoids 57, 58 (FIG. 5), respectively, to provide the "pinch" necessary to move an article out of the WOF module as will be explained below.

In a typical operation in accordance with the present invention, front end 11 of sort machine 10 feeds a stack of documents (e.g. letters 14) one at a time past a reader (e.g. OCR 18 and/or BCR 19). The respective reader reads identifying indicia (e.g. Zip Code, address, bar code, etc.) on each letter and uses that signal to print the appropriate barcode and/or endorsement, verify the accuracy of that which is printed and then direct that letter to its designated pocket 22 in stacker 12 as is known in the art. Such sort machines are well known and are commercially available from several sources; e.g. NPI MAXIM™ Mail Sorter, manufactured by National Presort, Inc., Dallas, Tex.

In accordance with the present invention, as shown in FIG. 2, after a letter 14 is read, it carried between belts 45, 70 of the entry transport 16a and its leading edge is delivered into the "pinch" between the first set of entry pinch rollers 41, 42. At this stage of the operation (FIG. 2), the first and second sets of entry pinch rollers 41,42 and 43, 44, respectively, are engaged while the first and second sets of exit pinch rollers 51, 52 and 53, 54, respectively, are disengaged. Support arms 46, 47 are adapted to bias the respective rollers 42, 44 towards rollers 41, 43 to allow letter 14 to easily enter the gap therebetween but at the same time apply significant pressure between the rollers to allow belt 45 to continue moving letter 14 through WOF module 30 without any effective slippage.

The first set of entry pinch rollers 41, 42 next delivers the leading edge of letter 14 into pinch between the second set of entry pinch rollers 43, 44 in the same manner as described above. As a letter 14 passes between rollers 43, 44, shaft encoder 50 measures the thickness of the letter and generates a signal which actuates motor 40 to move arm 39 and roller 38 towards or away from acceleration roller 32 to thereby adjust the gap between acceleration rollers to approximately that of the measured thickness of letter 14.

By adjusting the gap between the acceleration rollers to that of the thickness of the letter to be "weighed", any drag otherwise caused by the pinch pressure between the acceleration rollers will be substantially the same regardless of the thickness of the letter. Accordingly, each letter enters the pinch between acceleration rollers 31, 38 at the same velocity $V_1$. This velocity may be known and constant for all letters (i.e. speed of transport 16) or it can be measured and recorded by controller 35.

As the leading edge of letter 14 passes through the second set of entry pinch rollers 43, 44 (FIG. 3), it passes a sensor 75 (e.g. a set of photocells) which generate signals (a) to solenoids 48, 49 to retract rollers 42, 44; (b) to programmable controller to start the speed up of acceleration roller 32 and to start an effective timing means (not shown) within the controller 35. The distance between sensors 75 and the pinch between acceleration rollers 32, 38 is fixed and can easily be compensated for in any measurement calculations. Also, it will be noted that once the leading edge of letter 14 is in pinch between the acceleration rollers, all other pinch rollers are disengaged so that there is no excessive drag on the letter as it is being "weighed". Upon entering the pinch between the acceleration rollers, controller 35 starts to accelerate roller 31 which, in turn, starts to accelerates letter 14. Also, the timer means is started.

Letter 14 is continuously accelerated until the trailing edge of the letter passes sensor 75 which now generates signals to stop the timer and move the first and second sets of exit pinch rollers 54, 55, respectively into engagement to establish the pinch necessary to move letter 14 out of WOF module 30. Also, the final velocity $V_2$ of letter 14 is measured and recorded by controller 35. As the tail of letter 14 passes completely through the pinch between the acceleration rollers, it passes by sensor 76 (e.g. photocells) which generates a signal to controller 35 to slow motor 34 back to its original speed (i.e. $V_1$) and to move the entry and exit pinch rollers to their original positions shown in FIG. 2 in preparation for the next letter 14.

It can be seen from the above that there will be a definitive time "t" associated with the acceleration of each letter from $V_1$ to $V_2$ and this time relates directly to a particular mass in accordance with the following known formula:

$(F)$Force$=(m)$mass times$(a)$acceleration or $$m=F/(\Delta \text{Velocity/time}) \qquad (2)$$

wherein:

$$\Delta \text{Velocity}=(V_2-V_1)$$

One way to correlate times to specific masses is to run a number of articles of known weigh through WOF module 30 and then produce a table or chart collating the measured times with known weighs. Preferably, however, as will be well understood in the art, the measured times, velocities, etc. can be supplied directly into computer algorithms which calculate and record the weigh of each letter as it passes through WOF module 30.

Tests have been performed wherein good reproducibility of results have been achieved. Several letters of varying weighs were accurately weighed by scale and then were fed through a WOF module in accordance with the present invention with the results being summarized as follows:

| No. of Letters | WEIGHT (OZ) | TIME (MILLISECS) |
| --- | --- | --- |
| 19 | 0.5 | 18.2 (a) |
| 20 | 0.6 | 20.8 |
| 18 | 0.7 | 22.2 (b) |
| 20 | 0.8 | 24.2 (c) |
| 21 | 1.0 | 26.4 |
| 16 | 1.2 | 29.2 |
| 15 | 1.3 | 30.2 (d) |
| 12 | 1.4 | 32.4 (e) |
| 11 | 1.6 | 35.6 (f) |
| 10 | 1.7 | 38.0 (g) |
| 9 | 2.0 | 39.8 (h) |

In the above tests, there was an occasional minor variance in the results. That is, the number of letters for which there was a slight variance was: in (a) 1 letter; (b) 3 letters; (c) 1 letter; (d) 2 letters; (e) one letter; (f) 3 letters; (g) 1 letter; and (h) 1 letter.

The time readings for an article having a given weigh may vary over time depending on changing mechanical factors such as wear. To compensate for this, the WOF module 30 should be calibrated at regular intervals by using articles of known weighs to establish the "times" for each weigh to be substituted for the prior data. This is similar to the regular calibration of any weighing scale or device.

Figure 6:
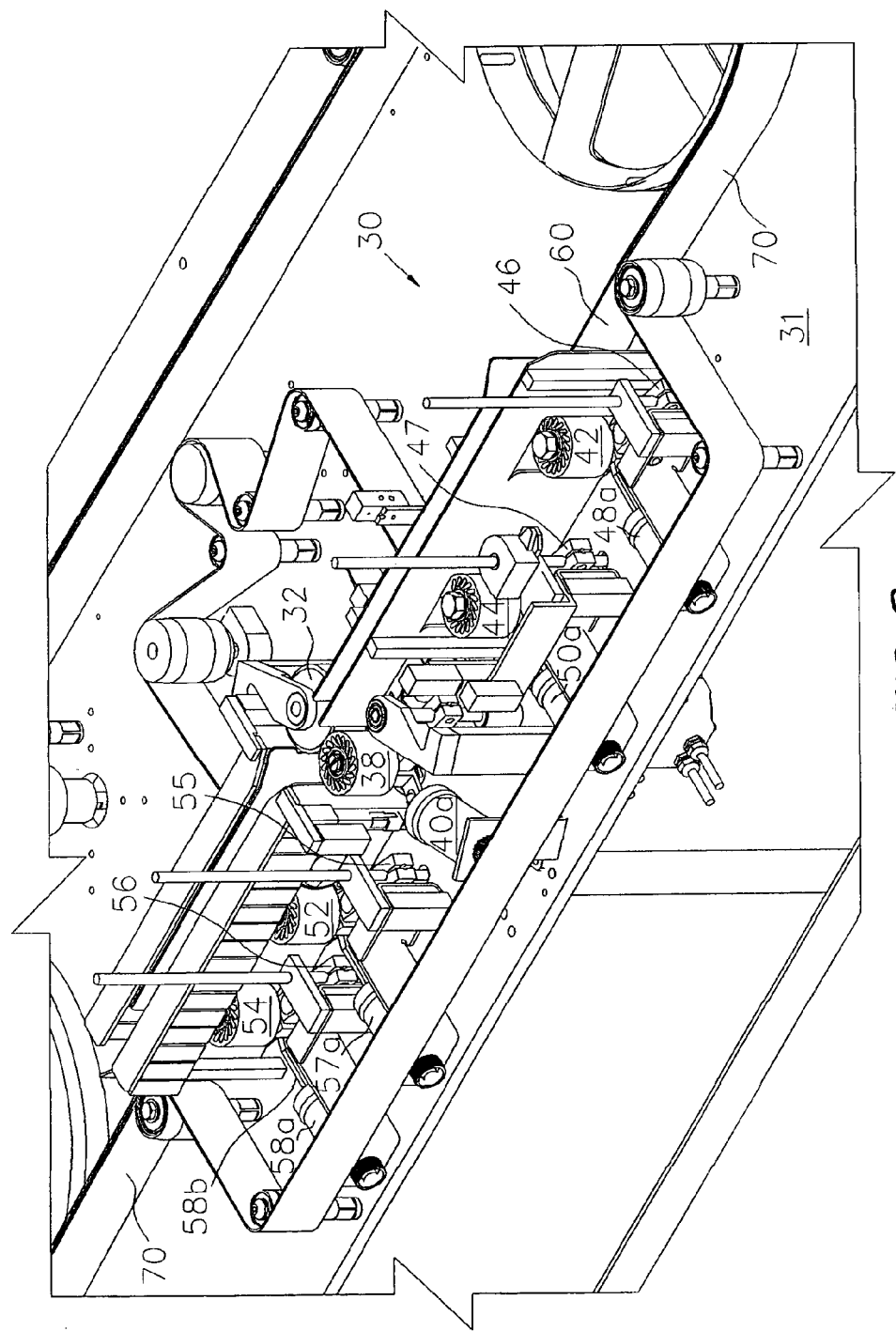
FIG. 6 is a partial, perspective view of a further modification of the WOF module of FIG. 1.

FIG. 6 discloses a modification of the WOF module 30 described above which includes means which "cushion" the drag that may be applied on a letter 14 as it is fed into and through the module 30. Preferably, all of the entry pinch rollers 42, 44, the exit pinch rollers 52, 54, and acceleration roller 38 are hollow, air-filled, tire-like rollers that give slightly when they are moved into engagement with the cooperating rollers in their respective sets.

Also, individual "shock absorbers" or dampers 48a, 50a, 57a, 58a and 40a, are positioned on plate 31 and are attached to arms 46, 47, 55, 56, and 39, respectively to maintain the respective rollers against a letter 14 without excessive pinch pressure as the letter passes through the WOF module. That is, each shock absorber is comprised of a cylinder having a piston rod 58b (only one numbered in FIG. 6) which, in turn, is operably connected to its respective roller through its respective arm. Preferably, the cylinder is filled with compressible gas such as air and, as will be understood in the art, each act similarly to a shock absorber on an automobile. This allows each roller to react to any deformities in a particular letter and still remain in constant, contact with the letter during the weighing of the letter.

What is claimed is:

1. An apparatus for weighing an article while said article is in motion using a weigh-on-the-fly WOF module, said module comprising:
   an acceleration roller adapted to engage said article;
   a constant torque servo motor connected to said acceleration roller for (a) driving said acceleration roller at a first velocity $V_1$ and upon receiving a signal (b) accelerating said roller to a second velocity $V_2$ without any effective change in torque during acceleration;
   a controller programmable for controlling said velocities of said motor and for measuring velocities of said acceleration roller and time of acceleration between $V_1$ and $V_2$;
   means for delivering said article to said acceleration roller; and
   means for transporting said article from said WOF module after said article passes said acceleration roller.

2. The apparatus of claim 1 including:
   an acceleration pinch roller adapted to be moved towards or away from said acceleration roller to adjust the gap between the acceleration roller and said acceleration pinch roller; and
   means for measuring the thickness of said article and adjusting said gap between the acceleration roller and said acceleration pinch roller to that approximately equal to the measured thickness of said article.

3. A mail sort machine having a magazine for feeding mail pieces into a transport of a stacker section having a plurality of sort pockets for said mail pieces; said mail sort machine having a weigh-on-the-fly WOF module positioned between said magazine and said stacker section, said WOF module comprising:
   a plate;
   an acceleration roller on said plate and adapted to engage said mail piece;
   a constant torque servo motor connected to said acceleration roller (a) for driving said acceleration roller at a first velocity $V_1$ and upon receiving a signal (b) accelerating said roller to a second velocity $V_2$ without any effective change in torque during acceleration upon receipt of a signal;
   a controller programmable for controlling said velocities of said motor and for measuring (a) velocities of said acceleration roller and (b) time of acceleration of said mail piece between $V_1$ and $V_2$;
   entry pinch rollers for delivering said article from said transport to said acceleration roller;
   a first sensor for detecting said mail piece as it approaches said acceleration roller to generate a first signal to said controller to (a) accelerate said motor and acceleration roller from said first velocity $V_1$ towards said second velocity $V_2$ and (a) start a timer within said controller;
   a second sensor for detecting said mail piece as it passes said acceleration roller to generate a second signal to said controller to (a) return said motor to said first $V_1$ and (2) stop said timer in said controller to measure the time of acceleration between $V_1$ and $V_2$; and
   exit pinch rollers for transporting said mail piece from said WOF module into said transport of said stacker section.

4. The sort machine of claim 3 including:
   an acceleration pinch roller movable towards and away from acceleration roller to provide the pinch necessary between said rollers to move said mail piece pass said acceleration roller during acceleration of said mail piece.

5. The sort machine of claim 4 wherein said entry pinch rollers comprise:
   at least one set of two entry pinch rollers, one of said entry roller being movable towards and away from the other of said two entry rollers to provide the pinch between said two entry rollers necessary to move said mail piece towards said acceleration roller.

6. The sort machine of claim 5 including:
   a shaft encoder connected to said one of said entry rollers for (a) measuring the thickness of said mail piece as said mail piece moves between said two entry rollers and (b) generating a signal for adjusting the gap between said acceleration roller and said acceleration pinch roller to that equal to the measured thickness of said mail piece.

7. The sort machine of claim 6 wherein said exit pinch rollers comprise:
   at least one set of two exit pinch rollers, one of said exit roller being movable towards and away from the other of said two exit rollers to provide the pinch between said two entry rollers necessary to move said mail piece from said WOF module into said transport of said stacker section.

8. The sort machine of claim 7 wherein each of said entry pinch rollers, said exit pinch rollers, and said acceleration pinch roller comprise:
   a hollow, air-filled, roller.

9. The sort machine of claim 7 including:
   a shock absorber attached to each of said entry pinch rollers, said exit pinch rollers to maintain said rollers in constant, contact with said mail piece while reacting to any deformities in a particular mail piece as said mail piece passes through said WOF module.

10. The sort machine of claim 9 wherein said shock absorber comprises:
    a cylinder mounted on said plate and position adjacent a respective roller; and
    a piston rod slidably mounted in said cylinder and operably connected to said respective roller.

11. The sort machine of claim 10 wherein said cylinder is filled with a compressible gas.

12. A method of weighing an article while said article is in motion, said method comprising:
    accelerating said article from a first velocity $V_1$ to a second velocity $V_2$ while maintain a constant torque on said article during acceleration;
    measuring the time it takes to accelerate said article from $V_1$ to $V_2$; and
    calculating the weight of said article in accordance with the formula:

$$F=ma$$

wherein
    F=force (torque)
    m=mass (weight); and
    a=acceleration wherein acceleration=$(V_2-V_1)$/time.

13. The method of weighing a mail piece while said mail piece is in motion and being sorted by a sort machine, said method comprising:

feeding said mail piece from a magazine of said sort machine into at least one set of entry pinch rollers of a weigh-on-the-fly WOF module;

moving said mail piece from said at least one set of entry pinch rollers into engagement with an acceleration roller in the WOF module which is rotating at a first velocity $V_1$;

accelerating said acceleration roller under constant torque to a second velocity $V_2$ as said mail piece moves into pinch between said acceleration roller and an acceleration pinch roller;

measuring the time of acceleration between $V_1$ and $V_2$;

delivering said mail piece to at least one set of exit pinch rollers to move said mail piece from said WOF module into a transport of a stacker section of said mail sort machine; and calculating the weight of said article in accordance with the formula:

$$F=ma$$

wherein
F=force (torque)
m=mass (weight); and
a=acceleration wherein acceleration=$(V_2-V_1)$/time.

14. The method of claim 13 including:

measuring the thickness of said mail piece as it passes through said at least one set of entry pinch rollers; and adjusting the gap between said acceleration roller and said acceleration pinch roller to that equal to the measured thickness of said mail piece to thereby prevent excessive drag on said mail piece during acceleration.

15. The method of claim 14 including:

disengaging said at least one set of entry pinch rollers after the leading edge of said mail piece enters the pinch between said acceleration roller and said acceleration pinch roller.

16. The method of claim 15 including:

disengaging said at least one set of exit pinch rollers until said mail piece has been accelerated.

17. The method of claim 16 including:

returning said acceleration roller to said first velocity $V_1$ after said mail piece has been accelerated to said second velocity $V_2$ and re-engaging said at least one set of entry pinch rollers.

\* \* \* \* \*